United States Patent
Blaikie (10) Patent No.: US 8,086,018 B2
(45) Date of Patent: Dec. 27, 2011

(54) METHODS OF PROCESSING A CHECK IN A CHECK STOCK VERIFICATION SYSTEM

(75) Inventor: Andrew R. Blaikie, Waterloo (CA)

(73) Assignee: NCR Corporation, Duluth, GA (US)

(*) Notice: Subject to any disclaimer, the term of this patent is extended or adjusted under 35 U.S.C. 154(b) by 1147 days.

(21) Appl. No.: 11/899,382

(22) Filed: Sep. 5, 2007

(65) Prior Publication Data

US 2007/0297664 A1    Dec. 27, 2007

(51) Int. Cl.
*G06K 9/00* (2006.01)
*G07F 7/04* (2006.01)
*G07D 7/00* (2006.01)

(52) U.S. Cl. .......... 382/137; 194/206; 194/302

(58) Field of Classification Search .......... 382/135, 382/136, 137, 138, 139, 140; 194/205, 206, 194/209–212, 290, 302, 312; 235/3, 17, 235/53, 437; 705/45
See application file for complete search history.

(56) References Cited

U.S. PATENT DOCUMENTS

| | | | |
|---|---|---|---|
| 5,444,794 A * | 8/1995 | Uhland, Sr. | 705/45 |
| 6,611,598 B1 * | 8/2003 | Hayosh | 380/54 |
| 7,430,310 B2 * | 9/2008 | Kotovich et al. | 382/137 |
| 7,469,824 B1 * | 12/2008 | Crews et al. | 235/379 |
| 2003/0218061 A1 * | 11/2003 | Filatov | 235/379 |
| 2005/0097019 A1 | 5/2005 | Jacobs | |
| 2006/0015733 A1 * | 1/2006 | O'Malley et al. | 713/176 |

* cited by examiner

*Primary Examiner* — Abolfazl Tabatabai
(74) *Attorney, Agent, or Firm* — Michael Chan; Paul W. Martin (57) ABSTRACT

A method is provided of a bank processing a check in a check stock verification system. The method comprises receiving a check image having at least one pre-printed element, extracting the at least one pre-printed element from the check image, comparing the extracted pre-printed element with a reference pre-printed element, providing a confidence value based upon the comparison of the extracted pre-printed element with the reference pre-printed element, selecting one of a plurality of confidence threshold values based upon amount of the check, and comparing the confidence value with the selected confidence threshold value to determine if payment of the check amount is approved.

9 Claims, 6 Drawing Sheets

| DOLLAR RANGE | CONFIDENCE THRESHOLD | DETECTION RATE OF TRUE FRAUD | FALSE POSITIVE PERCENTAGE |
|---|---|---|---|
| ALL AMOUNTS | 95 | 99.5% | 10% |

TABLE I

FIG. 3B
PRIOR ART

| DOLLAR RANGE | PERCENTAGE OF CHECKS | TOTAL NUMBER OF ITEMS | FALSE POSITIVE PERCENTAGE | NUMBER OF FALSE POSITIVES |
|---|---|---|---|---|
| ALL AMOUNTS | 100% | 100,000 | 10% | 10,000 (OR 10%) |

TABLE II

FIG. 4A
PRIOR ART

| DOLLAR RANGE | CONFIDENCE THRESHOLD | DETECTION RATE OF TRUE FRAUD | FALSE POSITIVE PERCENTAGE |
|---|---|---|---|
| ALL AMOUNTS | 50 | 80% | 1.0% |

TABLE III

FIG. 4B
PRIOR ART

| DOLLAR RANGE | PERCENTAGE OF CHECKS | TOTAL NUMBER OF ITEMS | FALSE POSITIVE PERCENTAGE | NUMBER OF FALSE POSITIVES |
|---|---|---|---|---|
| ALL AMOUNTS | 100% | 100,000 | 1.0% | 1,000 (OR 1.0%) |

TABLE IV

| DOLLAR RANGE | CONFIDENCE THRESHOLD | DETECTION RATE OF TRUE FRAUD | FALSE POSITIVE PERCENTAGE |
|---|---|---|---|
| $0 - $1,000 | 50 | 80% | 1.0% |
| $1,001 - $20,000 | 84 | 97.5% | 3.5% |
| ABOVE $20,000 | 95 | 99.5% | 10% |

TABLE V

FIG. 6B

| DOLLAR RANGE | PERCENTAGE OF CHECKS | TOTAL NUMBER OF ITEMS | FALSE POSITIVE PERCENTAGE | NUMBER OF FALSE POSITIVES IN THIS TIER |
|---|---|---|---|---|
| $0 - $1,000 | 75% | 75,000 | 1.0% | 750 |
| $1,001 - $20,000 | 20% | 20,000 | 3.5% | 700 |
| ABOVE $20,000 | 5% | 5,000 | 10% | 500 |
| | | | TOTAL NUMBER OF FALSE POSITIVES = | 1,950 (OR 1.95%) |

TABLE VI

METHODS OF PROCESSING A CHECK IN A CHECK STOCK VERIFICATION SYSTEM

BACKGROUND

The present invention relates to check stock verification systems, and is particularly directed to methods of processing a check in a check stock verification system.

A known system for detecting fraudulent checks is a check stock verification system in which a presented check is compared with a "reference" check which is associated with the checking account of the presented check. The comparison is automated in that there is no human intervention. Typically, a number of pre-printed elements from the presented check are compared with known pre-printed elements from the reference check to ensure that the presented check has not been forged or altered. If the pre-printed elements match, then payment of the presented check amount is approved. However, if the pre-printed elements do not match, then payment of the presented check amount is not approved and a human operator is alerted of a potentially fraudulent check.

From time to time, a presented check is authentic, but for some reason the pre-printed elements on the presented check do not match the pre-printed elements on the reference check. The mismatch could occur for any number of different reasons. As an example, the mismatch could occur because of the pre-printed elements on the presented check having been worn away. As another example, the manner in which the presented check was scanned may be different from the manner in which the reference check was scanned, resulting in different image resolutions, orientations, and the like. As still another example, the quality of the pre-printed elements on the presented check may be relatively poor as compared to the quality of the pre-printed elements on the presented check. This could occur if, for example, the image of the reference check was previously migrated from an older system.

A determination of a mismatch when the presented check is in fact authentic is known as a "false positive". The total number of false positives in a single day may be large. As an example, the rate of false positives may be ten percent, and the total number of presented checks being processed by the check stock verification system may be, for example, over 100,000 checks. If 100,000 presented checks are processed and the rate of false positives is ten percent, then there would be approximately 10,000 checks in a single day for manual review.

Since the number of false positives presented to a human operator for manual review would be relatively large, an unfavorable business case may arise where the cost to review exceeds the cost of the fraud losses avoided. Or equally problematic, the manual review process may be unsuccessful because of the "needle in the haystack" syndrome in which a human operator may not be alert enough to identify and sort out the relatively few presented checks from a group of thousands of checks presented for manual review. It would be desirable to reduce the number of false positives presented to a human operator for manual review so that the human operator can focus on fewer presented checks and, therefore, perform the job more quickly and with greater accuracy.

SUMMARY

In accordance with an embodiment of the present invention, a method of a bank processing a check in a check stock verification system comprises receiving a check image having at least one pre-printed element, extracting the at least one pre-printed element from the check image, comparing the extracted pre-printed element with a reference pre-printed element, providing a confidence value based upon the comparison of the extracted pre-printed element with the reference pre-printed element, selecting one of a plurality of confidence threshold values based upon amount of the check, and comparing the confidence value with the selected confidence threshold value to determine if payment of the check amount is approved.

DETAILED DESCRIPTION

Figure 1:
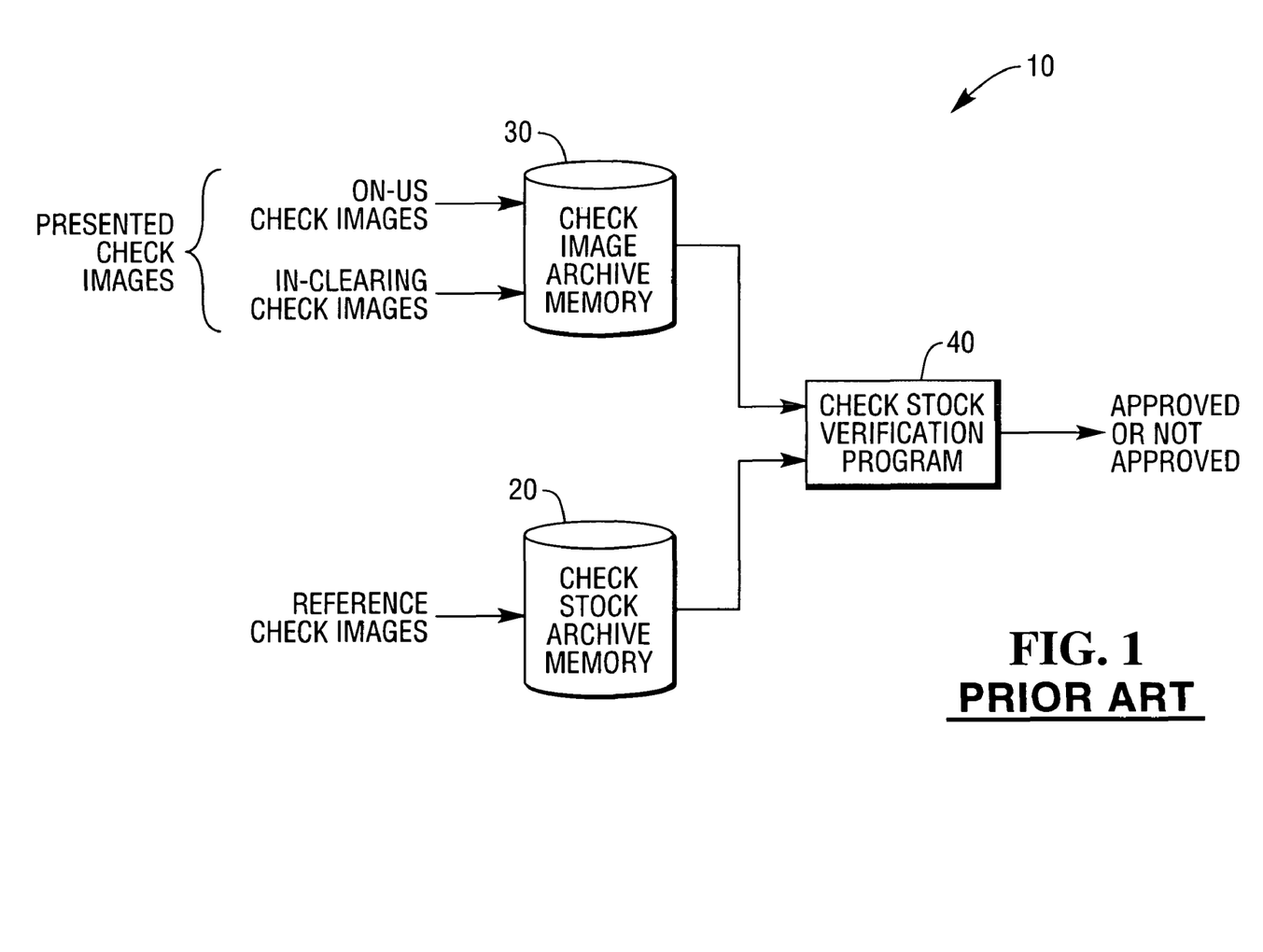
FIG. 1 is a schematic diagram representation of an example known check stock verification system.

A known check stock verification system 10 is illustrated in FIG. 1. The check stock verification system 10 is typically operated by a financial institution such as a bank. As shown in FIG. 1, a check stock archive memory 20 contains reference check images previously obtained from businesses opening up checking accounts with the bank. Typically, a business opening up a checking account initially receives a booklet of blank checks. One of the blank checks is scanned to capture a reference image of the blank check including pre-printed elements on the check. The captured reference check image is stored in the check stock archive memory 20.

A check image archive memory 30 contains a number of presented check images. Typically, the presented check images are provided from two different sources. One source is from on-us checks which have been cashed by the bank. The other source is from in-clearing checks which have cashed by another bank (i.e., the presenting bank), and subsequently sent to the bank (i.e., the paying bank) in a check clearing process.

During operation of the check stock verification system 10, a check stock verification program 40 compares a number of pre-printed elements from a presented check image contained in the check image archive memory 30 with corresponding pre-printed elements from a reference check image contained in the check stock archive memory 20. The checking account number associated with the presented check image is used to determine which reference check image is to be retrieved from the check stock archive memory 20 for comparison with the presented check image. Based upon this comparison, the program 40 provides an indication as to whether payment of the presented check is approved or not approved.

Figure 2:
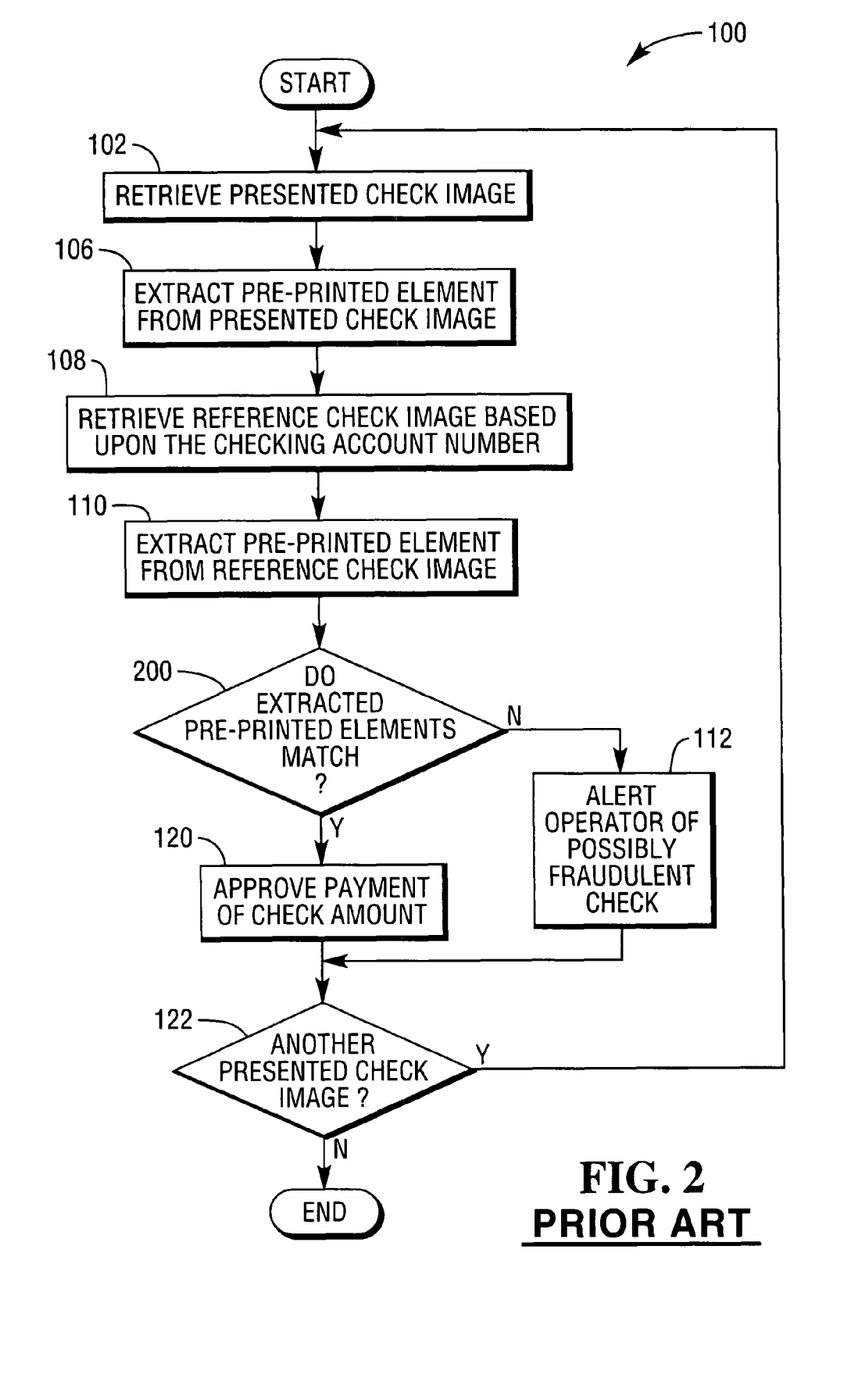
FIG. 2 is a flow diagram which depicts steps of a known check stock verification process used in the system of FIG. 1.

Referring to FIG. 2, a flow diagram 100 depicts steps of a known check stock verification process. In step 102, a presented check image from either an on-us check or an in-clearing check is retrieved from the check image archive memory 30. Then, in step 106, a pre-printed element contained in the presented check image is extracted from the presented check image. The pre-printed element extracted from the presented check image may comprise one or more of the following: the numbers contained in the check number field; the text contained in the payor name and address field; the "DATE" header field; the "PAY TO THE ORDER OF" header field; the "$" sign field; the "DOLLARS" header field; and the "MEMO" header field. The pre-printed element may comprise any combination of these and/or other fields of the presented check. As shown in step 108, a reference check image is retrieved from the check stock archive memory 20. The particular reference check image retrieved is based upon the checking account number associated with the particular presented check image retrieved in step 102.

A determination is then made in step 200 as to whether the extracted pre-printed element from the presented check image in step 106 matches the extracted pre-printed element from reference check image in step 110. There are a number of different ways to determine if there is a match. As an example, field content such as font type, font size, or font spacing may be compared to determine if there is a match of pre-printed elements. As another example, pair-wise distances between fields may be compared to determine if there is a match of pre-printed elements.

If the determination in step 200 is negative (i.e., the pre-printed elements do not match), then a bank operator is alerted that the presented check may be fraudulent, as shown in step 112. The process then proceeds to step 122 to determine if there is another presented check image to be processed. If the determination in step 122 is affirmative (i.e., there is another presented check image to be processed), the process returns to step 102 to retrieve the next presented check image from the check image archive memory 30. If the determination in step 122 is negative (i.e., there are no other presented check images to be processed), then the process terminates.

However, if the determination in step 200 is affirmative (i.e., the pre-printed elements do match), then payment of the amount of the presented check is approved, as shown in step 120. The process then proceeds to step 122 to determine if there is another presented check image to be processed. If the determination in step 122 is affirmative (i.e., there is another presented check image to be processed), the process returns to step 102 to retrieve the next presented check image from the check image archive memory 30. If the determination in step 122 is negative (i.e., there are no other presented check images to be processed), then the process terminates.

Figure 3A:
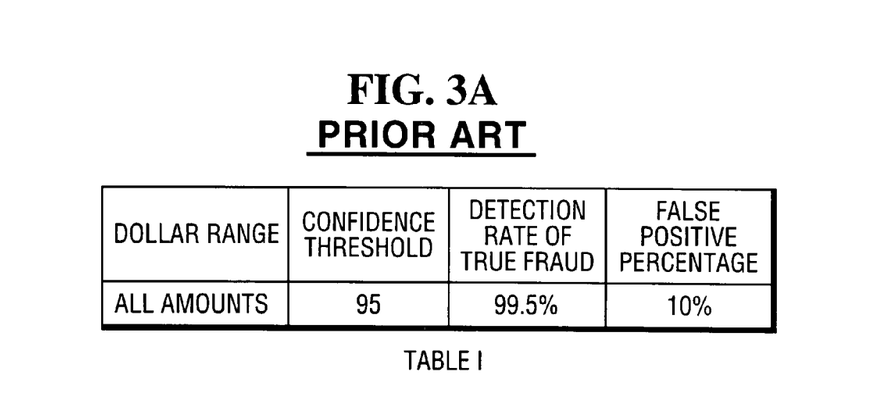
FIGS. 3A and 3B are tables which illustrate a known relationship between a confidence threshold and the number of false positives associated with this confidence threshold used in the known process of FIG. 2.
Figure 3B:
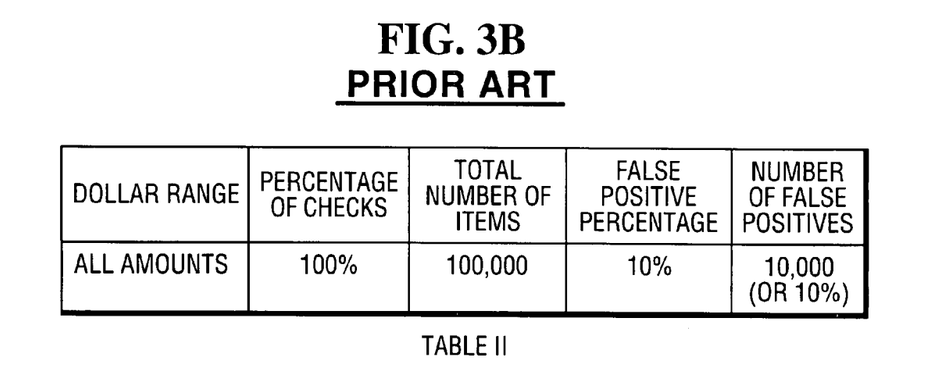

Referring to FIGS. 3A and 3B, a Table I and a Table II are illustrative of a known relationship between a confidence threshold value and the number of false positive items associated with the confidence threshold when step 200 shown in FIG. 2 is carried out. It should be noted that a check item is considered to be a mismatch when the recognition confidence value is determined to be below the confidence threshold value. As shown in Table I in FIG. 3A, when a confidence threshold value of ninety-five (95) is used, there is a ninety-nine and one-half (99.5) percent detection rate of true fraud and a ten (10) percent rate of false positives. Given a total number of 100,000 check items and a ten percent rate of false positives for all check amounts, there would be a total number of 10,000 false positives (i.e., 10% of 100,000 items), as shown in Table II in FIG. 3B.

Figure 4A:
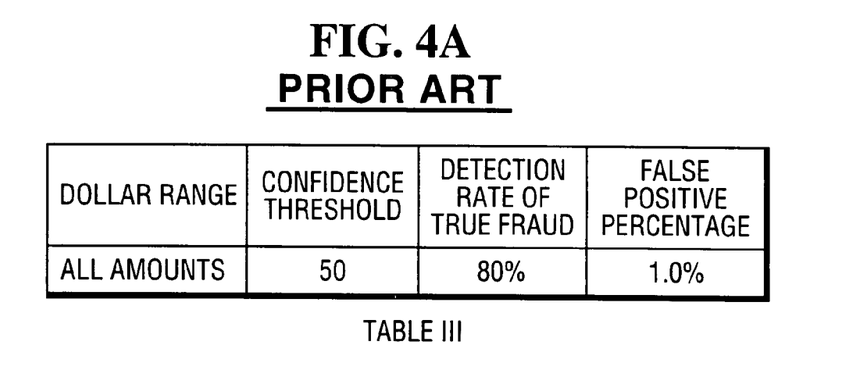
FIGS. 4A and 4B are tables similar to the tables of FIGS. 3A and 3B, and which illustrate another known relationship between a different confidence threshold and the number of false positives associated with this confidence threshold.
Figure 4B:
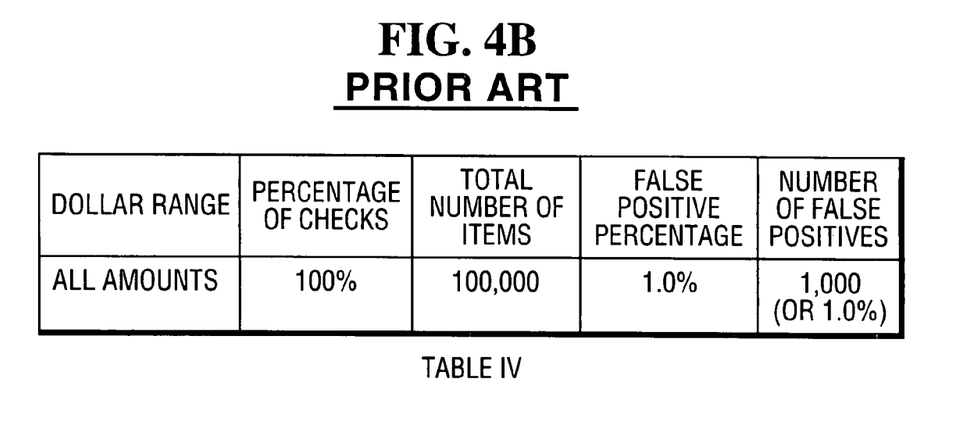

Referring to FIGS. 4A and 4B, a Table III and a Table IV are illustrative of a known relationship between a different confidence threshold value and the number of false positive items associated with this confidence threshold when step 200 shown in FIG. 2 is carried out. Again, it should be noted that a check item is considered to be a mismatch when the recognition confidence for the particular check item is determined to be below the confidence threshold value. As shown in Table III in FIG. 4A, when a confidence threshold value of fifty (50) is used, there is an eighty (80) percent detection rate of true fraud and a one (1) percent rate of false positives. Given again a total of 100,000 check items and now this time a one percent rate of false positives for all check amounts, there would be a total number of 1000 false positives (i.e., 1% of 100,000 items), as shown in Table IV in FIG. 4B.

It should be apparent that in the known relationships depicted in FIGS. 3A, 3B, 4A, and 4B, the total number of false positives for all check amounts decreases as the confidence threshold value is set lower. However, there is a drawback to setting a lower confidence threshold value because some check items will be missed as a true positive. While it may be acceptable to miss some lower amount checks which are true positives, it would not be acceptable to miss some higher amount checks which are true positives because this would result in too great of a financial loss.

Figure 5:
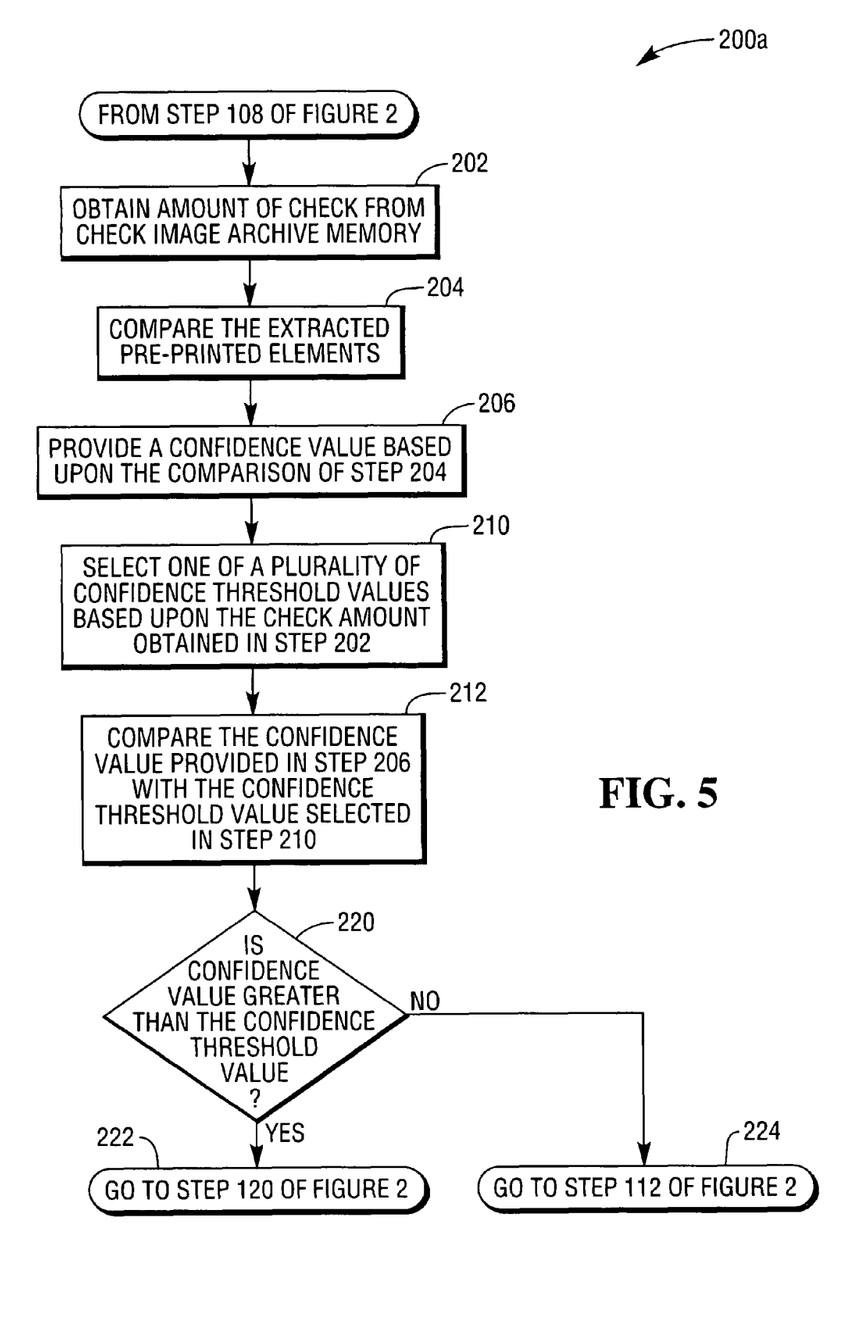
FIG. 5 is a flow diagram which depicts steps of a sub-process which is usable in the process of FIG. 2 and which is in accordance with an embodiment of the present invention.

Referring to FIG. 5, a sub-process 200a in accordance with an embodiment of the present invention is illustrated. The sub-process 200a illustrated in FIG. 5 is used in place of step 200 of the process 100 shown in FIG. 2. In step 202, the check amount is obtained from the check image archive memory 30. Typically, the check amount is contained in a check data file which is stored along with the corresponding presented check image in the check image archive memory 30. In step 204, the pre-printed element extracted from the presented check image in step 106 is compared with the pre-printed element extracted from the reference check image in step 110. Then, in step 206, a confidence value is determined and provided based upon the comparison of step 204. The comparison in step 204 and the providing of a confidence value in step 206 based upon that comparison are known and, therefore, will not be described.

In step 210, one of a plurality of recognition confidence threshold values is selected based upon the check amount obtained in step 202. These plurality of confidence threshold values are tiered as will be better explained hereinbelow with reference to FIGS. 6A and 6B. Then, in step 212, the confidence value provided in step 206 is compared with the confidence threshold value selected in step 210. A comparison is then made in step 220 to determine whether the confidence value provided in step 206 is greater than the confidence threshold value selected in step 210. If the determination in step 220 is affirmative (i.e., the confidence value is greater than the confidence threshold value), then the sub-process 200a of FIG. 5 proceeds to step 222 to return to step 120 of the process of FIG. 2 to approve payment of the check amount. However, if the determination in step 220 is negative (i.e., the confidence value is less than or equal to the confidence threshold value), then the sub-process 200a of FIG. 5 proceeds to step 224 to return to step 112 of the process 100 of FIG. 2 to alert an operator of a possibly fraudulent check. Payment of the check amount is not approved.

Figure 6A:
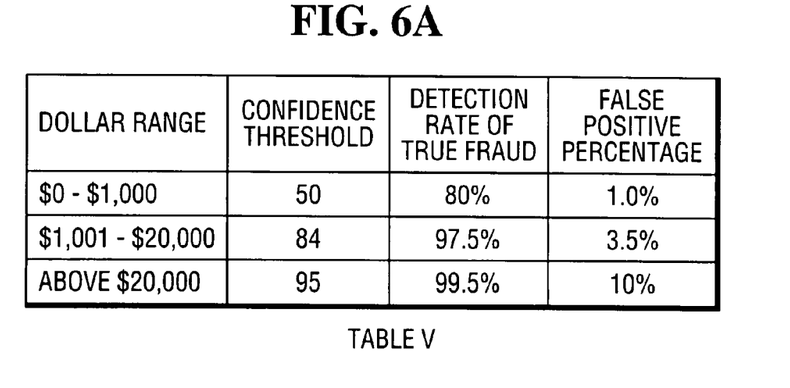
FIGS. 6A and 6B are tables which illustrate a relationship, in accordance with an embodiment of the present invention, between tiered recognition confidence threshold values and the number of false positives associated with these tiered recognition confidence threshold values used in the sub-process of FIG. 5.
Figure 6B:
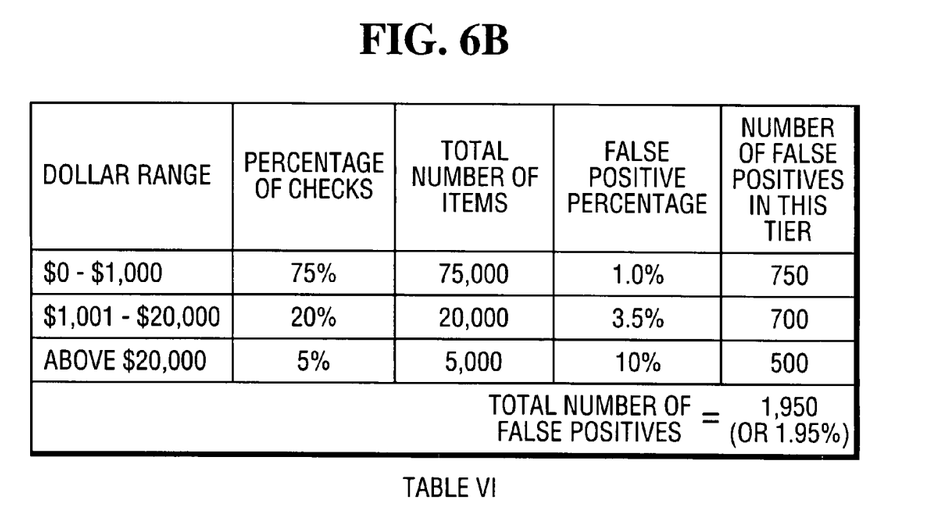

Referring to FIGS. 6A and 6B, a Table V and a Table VI are illustrative of a relationship, in accordance with an embodiment of the present invention, between the plurality of recognition confidence threshold values and the number of false positives associated with these plurality of confidence threshold values. As shown in Table V in FIG. 6A, when the amount of the check item is up to $1000, a first confidence threshold value of fifty (50) is used. When the first confidence threshold value of fifty is used, there is an eighty (80) percent detection rate of true fraud and a one (1) percent rate of false positives. Also, as shown in Table V in FIG. 6A, when the amount of the check item is between $1001 and $20,000, a second confidence threshold value of eighty-four (84) is used. When the second confidence threshold value of eighty-four is used, there is a ninety-seven and one-half (97.5) percent detection rate of true fraud and a three and one-half (3.5) percent rate of false positives. Further, as shown in Table VI in FIG. 6A, when the amount of the check item is over $20,000, a third confidence threshold value of ninety-five (95) is used. When the third confidence threshold value of ninety-five is used, there is a ninety-nine and one-half (99.5) percent detection rate of true fraud and a ten (10) percent rate of false positives.

Assuming that only about seventy-five (75) percent of all the check items being processed has an amount up to $1000 and given a false positive percentage of one (1) percent for these checks, there would be a total of 750 false positives, as shown in Table VI in FIG. 6B. Similarly, assuming that only about twenty (20) percent of all the check items being processed has an amount between $1001 and $20,000 and given a false positive percentage of three and one-half (3.5) percent for these checks, there would be a total of 700 false positives, as shown in Table VI in FIG. 6B. Again, similarly, assuming that the remaining five (5) percent of all checks have an amount over $20,000 and given a false positive percentage of ten (10) percent for these checks, there would be a total of 500 false positives, as shown in Table VI in FIG. 6B. Accordingly, the total number of all false positives using the tiered confidence threshold values of FIG. 6A is 1950 (i.e., 750+700+500) as shown in Table VI in FIG. 6B.

It should be apparent that the use of a plurality of different recognition confidence threshold values (i.e., the tiered confidence threshold values shown in Table V in FIG. 6A) results in a relatively higher percentage (10% in this example) of false positives for those check items which have amounts over $20,000, and a relatively lower percentage (1% in this example) of false positives for those check items which have amounts up to $1000. The percentage of false positives for those check items which have amounts between $1001 and $20,000 is 3.5% which is between the 10% (for check amounts over $20,000) and the 1% (for check amounts up to $1000).

It should be noted that the total number of false positives in Table VI in FIG. 6B for check amounts over $20,000 and presented for manual review is 500. This 500 number in Table VI in FIG. 6B is the same as the total number of false positives in Table II in FIG. 3B for check amounts over $20,000 (i.e., 5% of all checks (100,000) is equal to 5000 checks, and a 10% false positives rate makes the total number of false positives equal to 500). While the total number of false positives in Table VI in FIG. 6B would be the same as the total number of false positives in Table II in FIG. 3B for amounts over $20,000, it should be noted that the total number of false positives in Table VI in FIG. 6B for all check amounts (i.e., 1950) is significantly less than the total number of false positives in Table II in FIG. 3B for all check amounts (i.e., 10,000). The reduction from 10,000 to 1950 false positives for all check amounts is a significant reduction of the total number of checks which need to be reviewed by the human operator. Since the human operator has significantly fewer checks to review, the operator can better focus on the relatively fewer checks. With better focus, the operator can perform the job of reviewing the checks more quickly and with greater accuracy.

Moreover, it should be noted that even though the total number of checks which need to be reviewed by the human operator has been reduced, the total number checks in the relatively higher amounts (i.e., over $20,000) in Table VI in FIG. 6B is substantially the same as the total number of checks over $20,000 in Table II in FIG. 3B. In this regard, note from FIG. 3B that the total number of checks over $20,000 is 5000 (i.e., 5% of 100,000), and that the number of false positives for these 5000 checks is 500 (i.e., 10% of 5000). This number of 500 false positives associated with FIG. 3B is the same as the number of 500 false positives associated with Table VI in FIG. 6B. Accordingly, by using a plurality of different recognition confidence threshold values as illustrated in FIGS. 5, 6A, and 6B, the result is a significant reduction of total number of false positives for all check amounts (as evidenced by the reduced number of false positives from 10,000 to 1950 for all check amounts as just described hereinabove) with essentially no reduction of the total number of false positives in the higher amount checks (as evidenced by the unchanged number of 500 false positives for check amounts over $20,000 also as just described hereinabove).

Although the above description of Table V in FIG. 6A describes three different dollar ranges with different confidence threshold values, it is conceivable that less than three (i.e., only two) or more than three different dollar ranges with different confidence threshold values be used. It should also be noted that all of the numbers used in the tables of FIGS. 6A and 6B are just examples to show relationships. Accordingly, the specific dollar ranges illustrated in FIG. 6A are only examples, and the specific confidence threshold values illustrated in FIG. 6A are also only examples.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of a bank processing a presented check in a check stock verification system, the method comprising:
retrieving an image of the presented check;
extracting a pre-printed element from the presented check image;
retrieving a reference check image;
extracting a pre-printed element from the reference check image;
obtaining a check amount associated with the presented check;
comparing the extracted pre-printed element from the presented check with the extracted pre-printed element from the reference check image;
providing a confidence value based upon the comparison of the pre-printed element extracted from the presented check image with the pre-printed element extracted from the reference check image;
selecting a first confidence threshold value if the presented check amount is below a first predetermined amount;

selecting a second confidence threshold value which is different from the first confidence threshold value if the presented check amount is above a second predetermined amount;

comparing the confidence value with the selected confidence threshold value;

determining if payment of the presented check amount is approved based upon the comparison of the confidence value with the selected confidence threshold value.

2. A method according to claim 1, further comprising:

alerting a bank operator for manual review of the presented check if a determination is made that the payment of the check amount is not approved.

3. A method according to claim 1, wherein the first predetermined amount is less than the second predetermined amount.

4. A method according to claim 1, wherein the first predetermined amount and the second predetermined amount are the same.

5. A method according to claim 1, further comprising:

selecting a third confidence threshold value if the presented check amount is between the first predetermined amount and the second predetermined amount.

6. A method according to claim 1, wherein the presented check comprises a check which is an on-us check received from a customer of the bank.

7. A method according to claim 1, wherein the presented check comprises a check which is an in-clearing check received from another bank.

8. A method of a bank processing an on-us check, the method comprising:

receiving the on-us check from a bank customer;

scanning the on-us check to provide an image of the on-us check;

extracting a pre-printed element from the on-us check image;

retrieving a reference check image;

extracting a pre-printed element from the reference check image;

obtaining a check amount associated with the on-us check;

comparing the pre-printed element extracted from the on-us check image with the pre-printed element extracted from the reference check image;

providing a confidence value based upon the comparison of the extracted pre-printed elements;

selecting one of a plurality of confidence threshold values based upon the check amount;

comparing the confidence value with the selected confidence threshold value; and determining if payment of the check amount is approved based upon the comparison of the confidence value with the selected confidence threshold value.

9. A method according to claim 8, wherein the on-us check is presented to a bank operator for manual review of the check when payment of the check amount is not approved.

* * * * *